US009466144B2

United States Patent
Sharp et al.

(10) Patent No.: US 9,466,144 B2
(45) Date of Patent: Oct. 11, 2016

(54) 3D MAPPING OF A SURVEYED ENVIRONMENT

(71) Applicant: Trimble Navigation Limited, Sunnyvale, CA (US)

(72) Inventors: Alan Sharp, Westminster, CO (US); Mark Nichols, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 266 days.

(21) Appl. No.: 13/668,067

(22) Filed: Nov. 2, 2012

(65) Prior Publication Data

US 2014/0125651 A1    May 8, 2014

(51) Int. Cl.
*G06T 15/04* (2011.01)
*G06T 17/05* (2011.01)
*G06T 19/00* (2011.01)
*G01C 11/00* (2006.01)

(52) U.S. Cl.
CPC ............... *G06T 15/04* (2013.01); *G01C 11/00* (2013.01); *G06T 17/05* (2013.01); *G06T 19/006* (2013.01)

(58) Field of Classification Search
CPC ..... G06T 19/006; G06T 17/00; G06T 15/00; G06T 17/05; G01C 15/00; G01C 11/00; G01C 11/02; G06F 17/30241; G06F 17/241; G06F 17/3087
USPC ........................................................ 345/633
See application file for complete search history.

(56) References Cited

U.S. PATENT DOCUMENTS

| 8,098,894 B2* | 1/2012 | Soderstrom ................... 382/104 |
| 8,782,564 B2 | 7/2014 | Kistler |
| 2009/0241029 A1* | 9/2009 | Kistler .......................... 715/733 |
| 2012/0116728 A1* | 5/2012 | Shear ...................... G06F 17/50 703/1 |
| 2013/0155058 A1* | 6/2013 | Golparvar-Fard .... G06T 19/006 345/419 |

FOREIGN PATENT DOCUMENTS

| EP | 1426904 A1 | 6/2004 |
| WO | 2009084782 A1 | 7/2009 |
| WO | 2011085434 A1 | 7/2011 |

OTHER PUBLICATIONS

Schall et al.; Virtual Redlining for Civil Engineering in Real Environments; IEEE International Symposium on Mixed and Augmented Reality; Sep. 2008.*
Piekarski et al.; Tinmith-Metro: New Outdoor Techniques for Creating City Models with an Augmented Reality Wearable Computer; Wearable Computers, 2001. Proceedings. Fifth International Symposium on; Oct. 2001.*
Smith et al.; 3D GIS: a Technology Whose Time Has Come; Earth Observation Magazine; Nov. 2004.*
Chen et al.; Prototyping an in-field collaborative environment for landscape decision support by linking GIS with a game engine; Proc. SPIE 6418, Geoinformatics 2006; GNSS and Integrated Geospatial Applications, 641806 (Oct. 28, 2006).*

(Continued)

*Primary Examiner* — Carlos Perromat
(74) *Attorney, Agent, or Firm* — Kilpatrick Townsend & Stockton LLP

(57) ABSTRACT

A real time 3D survey site modeler is disclosed. One embodiment includes a survey data collector to collect survey data for a location and obtain information for each object that is surveyed. In addition, a 3D model creator receives the collected survey data and creates a 3D model of the world being surveyed in real time.

9 Claims, 12 Drawing Sheets

(56) References Cited

OTHER PUBLICATIONS

Dempsey; Case Study: Real-time GPS Mapping and GIS Solution Aids Efficient Disaster Management; GIS Lounge; https://web.archive.org/web/20091214235536/http://gislounge.com/case-study-real-time-gps-mapping-and-gis-solution-aids-efficient-disaster-management/; dated Dec. 8, 2009; captured by the Internet Archive Dec. 14, 2009.*

Sharp et al.; Can Beauregard Claims Show You the Money?; 2 Cybaris 25 (2011).*

Smith et al.; 3D GIS: A Technology Whose Time Has Come; Earth Observation Magazine; Nov. 2004. (Resubmitted for better quality).*

"PCT/US2013/067888 International Search Report and Written Opinion", Mar. 5, 2015, 9 Pages.

Schall, et al., "Virtual Redlining for Civil Engineering in Real Environments", 7th ISSS/ACM International Symposium on, IEEE, Piscataway, NJ, USA., Sep. 15, 2008, pp. 95-98.

* cited by examiner

475

3D MAPPING OF A SURVEYED ENVIRONMENT

BACKGROUND

In many cases, one or more surveys may be performed in a location to establish the actual position of landmarks, boundaries, property lines, building locations, utility lines, street locations and the like. These surveys may provide an additional level of accuracy to an existing map, an update to information on an older map, or completely new maps. Surveys may be performed for numerous reasons. For example, with respect to a construction project there may be an initial survey to designate the construction area, as well as areas of interest within the construction site. Additionally, as construction proceeds, further surveys may be performed to ensure the construction is being performed in the proper location. After construction is completed another survey may be performed to provide a complete and accurate map of the completed site.

BRIEF DESCRIPTION OF THE DRAWINGS

The accompanying drawings, which are incorporated in and form a part of this application, illustrate and serve to explain the principles of embodiments in conjunction with the description. Unless noted, the drawings referred to this description should be understood as not being drawn to scale.

DESCRIPTION OF EMBODIMENT(S)

Figure 1:
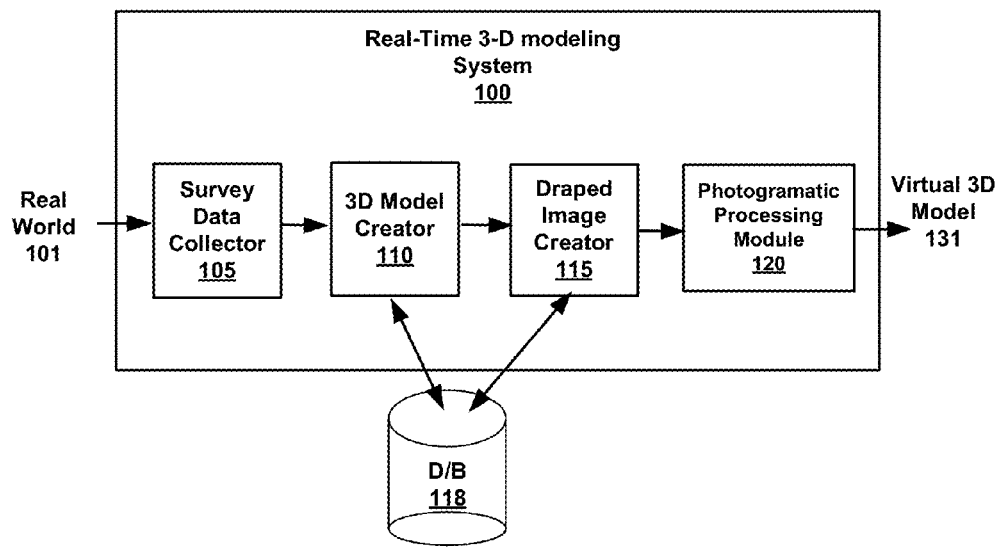
FIG. 1 is a block diagram of a 3D (three dimensional) modeling system according to one embodiment.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "receiving", "storing", "generating", "transmitting", "inferring," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

Overview

Embodiments described herein provide a fully automated rendered intelligent 3D/4D (four dimensional) virtual model that can be used to visualize, quantify, simulate over time and move onto the desired objective of the data—As Builts to manage the asset in its maintenance and operate life cycle, or pre-design measured environment into the design and then construct cycle. The intelligent 3D/4D model approach incorporates materials, objects, costs, times, conditions, maintenance cycles, part numbers and so on to assist in the bid, estimate, repair, maintain, specify, design processes—the virtual surveying is the means of quantifying the current state of 'as is' at any date and time in the product life cycle.

With typical data structure techniques, having to pick a 'feature code' or a 'feature type' from some form of predetermined library (often called a 'feature code library' or a 'data dictionary') constrains data collection in two main ways—firstly it is inflexible such as a pre-defined list, and secondly, picking from a list of words often without knowledge of what that word means in the office software where the code will be used to display the spatial feature with some meaningful symbology, where the symbology is intended to be a realistic proxy for the real world phenomena. This is particularly true when these libraries have been setup by workers who are no longer at the organization, or when the library is a mandated list that does not hold much meaning for the person in the field doing the work.

Therefore there is a reasonable probability of errors when data collection occurs: e.g., miss-interpreting a cryptic code, choosing an incorrect option from several similar looking codes, or just accidentally picking the wrong item in a list and not noticing it. As examples, consider two excerpts from one State's US Department of Transportation library below. The first example includes 'light' features. Without in-depth knowledge of lights and how the different codes will be processed, it is very difficult to know which one to pick and often the 'other' option is selected with a note to describe it in the field worker's own language, which eliminates the benefit of picking a feature code in the first place:
2575,N,N,LIGHTING,Aluminum light standard
2576,N,N,LIGHTING,Steel light standard
2577,N,N,LIGHTING,Wood light standard
2578,N,N,LIGHTING,Light on span wire pole
2579,N,N,LIGHTING,Light on mast arm pole
2580,N,N,LIGHTING,High mast on aluminum pole
2581,N,N,LIGHTING,High mast on steel pole
2582,N,N,LIGHTING,Spot or flood light
2583,N,N,LIGHTING,Lamp post/ornamental
2599,N,N,LIGHTING,Light/other (note required)

A second example is from the same library where the number of options for a storm-sewer pipe exceeds fifty choices:
2710,Y,N,STORM-SEWER,Reinforced concrete pipe/other (note required)
2712,Y,N,STORM-SEWER,Reinf conc pipe/elliptical
2713,Y,N,STORM-SEWER,Corr steel pipe
2714,Y,N,STORM-SEWER,Vitrified clay pipe
2715,Y,N,STORM-SEWER,Corr steel pipe/bit ctd
2716,Y,N,STORM-SEWER,Corr steel pipe/asb bonded
2717,Y,N,STORM-SEWER,Reinforced concrete pipe/12" [300 mm]
2718,Y,N,STORM-SEWER,Reinforced concrete pipe/15" [375 mm]
2719,Y,N,STORM-SEWER,Reinforced concrete pipe/18" [450 mm]
2720,Y,N,STORM-SEWER,Reinforced concrete pipe/21" [525 mm]
2721,Y,N,STORM-SEWER,Reinforced concrete pipe/24" [600 mm]
2722,Y,N,STORM-SEWER,Reinforced concrete pipe/30" [750 mm]
2723,Y,N,STORM-SEWER,Reinforced concrete pipe/36" [900 mm]
2724,Y,N,STORM-SEWER,Reinforced concrete pipe/42" [1050 mm]
2725,Y,N,STORM-SEWER,Reinforced concrete pipe/48" [1200 mm]
2726,Y,N,STORM-SEWER,Reinforced concrete pipe/54" [1350 mm]
2730,Y,N,STORM-SEWER,Reinf conc pipe/other/rev (note required)
2732,Y,N,STORM-SEWER,Reinf conc. pipe/ell/rev
2733,Y,N,STORM-SEWER,Corr steel pipe/rev
2734,Y,N,STORM-SEWER,Vitrified clay tile/rev
2735,Y,N,STORM-SEWER,Corr steel pipe/bit ctd/rev
2736,Y,N,STORM-SEWER,Corr stl pipe/asb bnd/rev
2737,Y,N,STORM-SEWER,Reinf concrete pipe/12"/rev [300 mm]
2738,Y,N,STORM-SEWER,Reinf concrete pipe/15"/rev [375 mm]
2739,Y,N,STORM-SEWER,Reinf concrete pipe/18"/rev [450 mm]
2740,Y,N,STORM-SEWER,Reinf concrete pipe/21"/rev [525 mm]
2741,Y,N,STORM-SEWER,Reinf concrete pipe/24"/rev [600 mm]
2742,Y,N,STORM-SEWER,Reinf concrete pipe/30"/rev [750 mm]
2743,Y,N,STORM-SEWER,Reinf concrete pipe/36"/rev [900 mm]
2744,Y,N,STORM-SEWER,Reinf concrete pipe/42"/rev [1050 mm]
2745,Y,N,STORM-SEWER,Reinf concrete pipe/48"/rev [1200 mm]
2746,Y,N,STORM-SEWER,Reinf concrete pipe/54"/rev [1350 mm]
2748,Y,N,STORM-SEWER,Storm sewer/other/rev (note required)
2749,Y,N,STORM-SEWER,Storm sewer/other (note required)
2775,Y,N,STORM-SEWER,Inlet type C
2776,Y,N,STORM-SEWER,Inlet type D
2777,N,N,STORM-SEWER,Manhole
2778,N,N,STORM-SEWER,Inlet type R/L=5 ft [1.5 m]
2779,N,N,STORM-SEWER,Inlet type R/L=10 ft [3 m]
2780,N,N,STORM-SEWER,Inlet type R/L=15 ft [4.5 m]
2781,N,N,STORM-SEWER,Inlet type 13
2782,N,N,STORM-SEWER,Inlet/other (note required)
2799,N,N,STORM-SEWER,Storm sewer/misc (note required)
2801,Y,N,STORM-SEWER,Rigid plastic pipe/12" [300 mm]
2802,Y,N,STORM-SEWER,Rigid plastic pipe/15" [375 mm]
2803,Y,N,STORM-SEWER,Rigid plastic pipe/18" [450 mm]
2804,Y,N,STORM-SEWER,Rigid plastic pipe/21" [525 mm]
2805,Y,N,STORM-SEWER,Rigid plastic pipe/24" [600 mm]
2806,Y,N,STORM-SEWER,Rigid plastic pipe/other (note required)
2821,Y,N,STORM-SEWER,Rigid plastic pipe/12"/rev [300 mm]
2822,Y,N,STORM-SEWER,Rigid plastic pipe/15"/rev [375 mm]
2823,Y,N,STORM-SEWER,Rigid plastic pipe/18"/rev [450 mm]
2824,Y,N,STORM-SEWER,Rigid plastic pipe/21"/rev [525 mm]
2825,Y,N,STORM-SEWER,Rigid plastic pipe/24"/rev [600 mm]
2826,Y,N,STORM-SEWER,Rigid plastic pipe/other/rev (note required)

In contrast, embodiments herein access a virtual 3D model of an area to be surveyed. In addition, survey data of an object is gathered and a wire framework of the object is generated. The wire framework is used to initially represent the object in the virtual 3D model. Once the wire frame is generated, a 3D image is designated to represent the object being surveyed. In one embodiment, the 3D image is selected from a database of visual 3D images. For example, the database structure uses features, groups, categories and then attributes that can have pick lists or automated entries etc. that make this more intuitive for a user. For example, there would be a group of codes called Storm Sewer, within the group would be more specific codes for Pipe, Inlet, Manhole, Clean Out, etc. Within each of those codes would be another batch of codes allowing a user to drill down through each code to associate additional attributes such as type, material, size, condition and so on.

Additionally, the survey data can be included in the drill down. For example, measurement location information such as, top of pipe (crown), bottom of pipe, invert of pipe, pipe numbers and weld numbers or joint details etc. In other words, the more detail entered in the field, the more accurate the 3D rendering and model can be as a result and the more information that can be extracted at a later date on demand. These attributes can extend to attachments like photos, videos, way files, sketches, documents and soon mini scans of the object that help capture all the required detail.

Typically real world objects were designed—those designs can be stored in a 3D object warehouse and retrieved based on basic object properties e.g. Type 3 Fire Hydrant, Red Color could get you a real object that can be truly rendered with less effort than the typical 2D renderings.

The attributes collected are used as search criteria in the warehouse to find the object required—if it doesn't exist—a user can create a model of an object and upload it to the warehouse. For example, by utilizing modeling software that can convert a selected "mini scan" into a solid object model then those mini scan objects can be used to populate the 3D warehouse. In other words, a 3D image is generated from one or more actual images of the object. For example, during the gathering of the survey data for the object, one or more photographic images are taken. The image(s) can be used to generate a 3D model of the surveyed object or the image(s) can be used to search the 3D database for a best match.

Once the 3D image is selected it is draped over the wire frame within the virtual 3D model. In addition, the gathered survey data is coupled to the 3D image in the virtual 3D model. For example, the 3D image may be tagged with the data such that the actual survey data information is related to the 3D image in the virtual 3D model of the survey area.

In one embodiment, at different times throughout the above described procedure, the 3D model is updated for any devices utilizing the 3D model. In one embodiment, the 3D model may be updated at a central location and disseminated to any auxiliary devices accessing the 3D model. In another embodiment, as the 3D model is modified on a specific device, the device will provide an update command to any other devices within range or on the same network. In so doing, the progress of the survey can be monitored in real-time or near real-time. Similarly, the progress of the survey can be shared by any devices within the network or the like. For example, if a plurality of survey teams were performing a survey of an area, they would be able to monitor the overall survey of the site via the 3D model and recognize any areas that are missed or overlapped in real or near real-time. The 3D model data sharing can be accomplished over peer-to-peer, Internet, Cloud, Mobile networks, and the like.

By providing the real-time 3D model updating, a survey can be performed more efficiently since any missing information may be recognized prior to the surveyor leaving the field. Similarly, any changes or questions can be addressed while the survey is being performed. For example, if a supervisor expected a certain type of storm-sewer pipe, and a different storm-sewer type appeared in the 3D model, the supervisor could review the data file associated with the 3D image. Moreover, if the 3D image was selected by the surveyor but was not based on an actual image of the storm-sewer, the supervisor could make a request for an actual image of the storm-sewer.

With reference now to FIG. 1, a block diagram of a 3D modeling system 100 is shown in accordance with one embodiment. One embodiment includes a survey data collector 105 to collect survey data for a real world 101 location and any objects in the real world 101. A 3D model creator 110 receives the collected survey data and creates a virtual 3D model of the world being surveyed. A draped image creator 115 uses the survey data to select a 3D representation of the object from a 3D imagery database 118. A photogramatic processing module 120 incorporates an image of the object with the 3D representation selected from the 3D imagery database 118 and the 3D representation of the object is incorporated into the virtual 3D model 131.

In one embodiment, 3D imagery database 118 is constructed from a set of data including mini scan data. In general, a mini scan is an object, surface, construction element that will be stored in a 3D imagery database 118 and will be tagged with a set of searchable codes and attributes that will facilitate rapid recall. For example the mini scan may be on bridge 3, pier 2, wingwall, front face or rebar cage or asbuilt etc. it may be dated and timed and may be given a construction status (pre construct, foundation, rebar, post concrete pour, finished etc.). In one embodiment, the mini scan will be geo-referenced and also tagged with codes and attributes so that a user can pull up all mini scans that may have been carried out on a particular bridge, or that pier or that wingwall etc. for analysis.

In one embodiment, after taking photos or mini scans of an object, the mini scans can be utilized to make a 3D model of the object, the scans may contain color or reflectance intensity data and the photos represent the object. By combining those data types to construct the 3D objects directly in the field will minimize blind office processing to extract the deliverable needs. In addition, being able to geo-locate those mini scans and package them up so that they can be rapidly retrieved on demand at a later date will also be a key part of the 3D virtual surveying, especially for structural objects—bridges, dams, buildings, water treatment facilities, power stations, cooling towers etc. Combination of the data types and utilizing draping technologies, and also photo interpretive intelligence to locate the object in the photo based on the model data of the object from the mini scan will also be critical to the solution.

Figure 2:
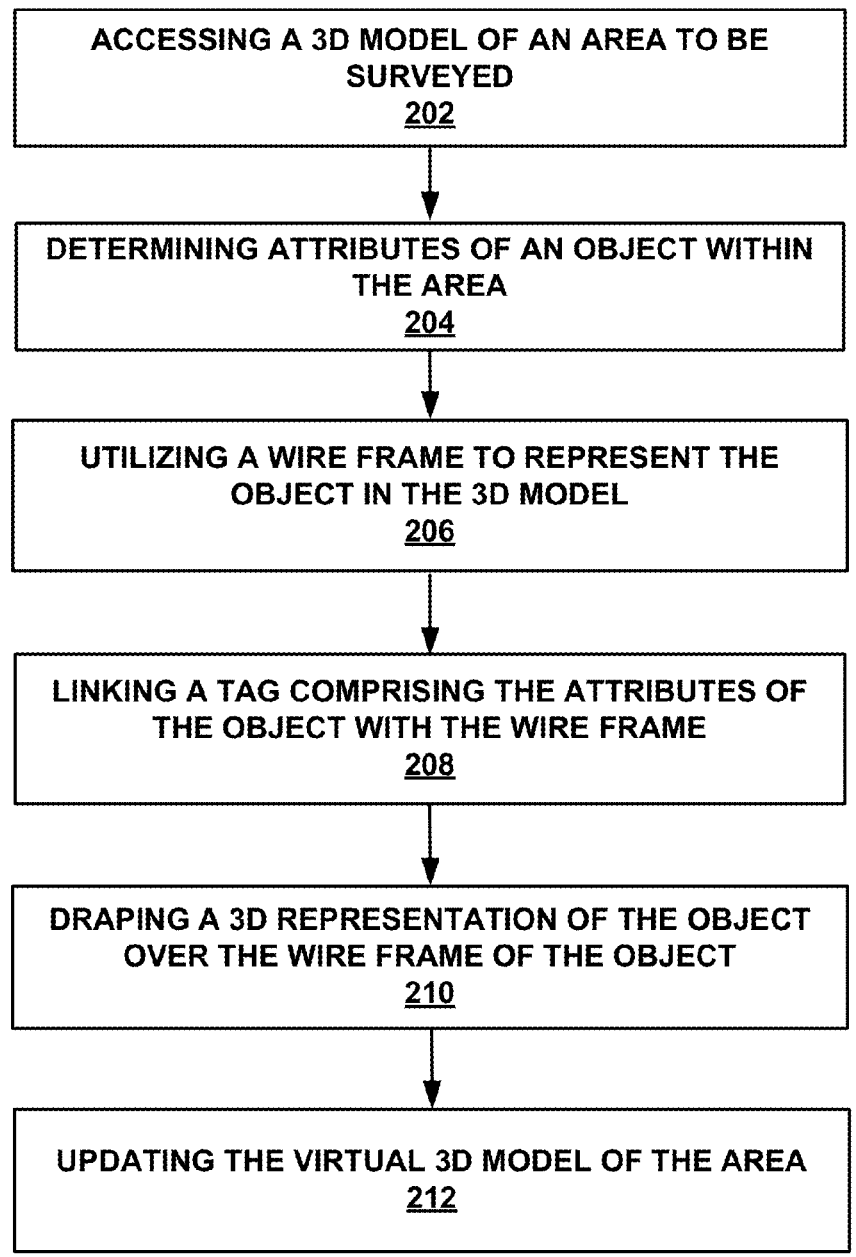
FIG. 2 is a flowchart of a method for creating a 3D model during a survey, according to one embodiment.

Referring now to FIG. 2, a flowchart of a method for creating a virtual 3D model during a survey is shown in accordance with one embodiment. For purposes of clarity, in the following discussion of flowchart 200 references will also be made to accompanying FIGS. 3A-4D to provide additional detail and clarification.

Figure 3A:
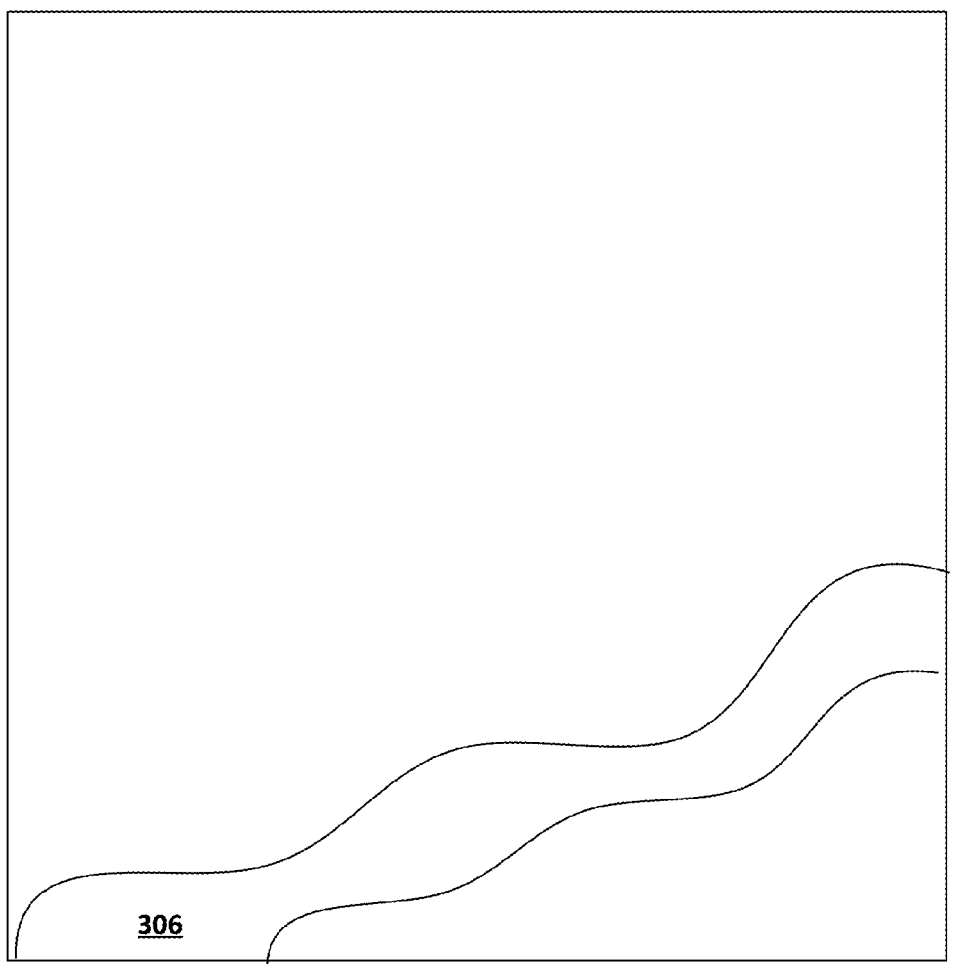
FIG. 3A is a graphical representation of an area to be surveyed according to one embodiment.

With reference now to 202 of FIG. 2 and FIG. 3A, one embodiment accesses a virtual 3D model 300 of an area to be surveyed. For example, virtual 3D model 300 is a graphical representation of an area to be surveyed shown in accordance with one embodiment.

In general, virtual 3D model 300 may be generated from an aerial map, a topographic map, a terrain map, a physical map, a road map, a satellite image or the like. In addition, virtual 3D model 300 may be scaled based on the size of the site, the desired granularity, or the like. In one embodiment, virtual 3D model 300 is downloaded from the internet. For example, in one embodiment virtual 3D model 300 may be sourced from an application such as TrimbleOutdoors or from a website such as mytopo or Trimbleoutdoors.com. In another embodiment, virtual 3D model 300 may be automatically downloaded based on input from a user such as: latitude and longitude, geodetic datums such as NAD 83 and WGS 84, or the like. In yet another embodiment, virtual 3D model 300 may be taken from a database stored on a CD, DVD or the like.

In one embodiment, virtual 3D model 300 may initially include features such as road 306. Similarly, virtual 3D model 300 may include landmarks, geographical features and the like from real world 101.

Figure 3B:
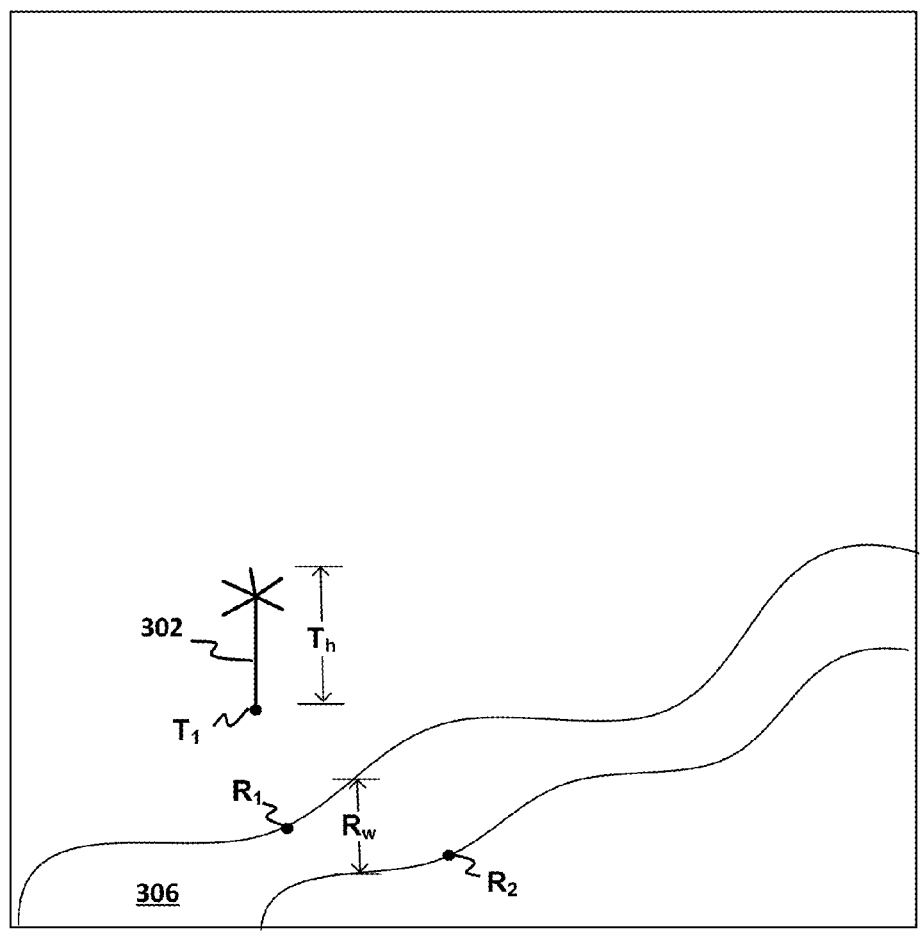
FIG. 3B is a graphical representation of an area to be surveyed having an object denoted by a framework, according to one embodiment.

Referring now to 204 of FIG. 2 and FIG. 3B, one embodiment defines attributes of an object within the area to be surveyed. In one embodiment, the attributes of an object are collected by survey data collector 105 of FIG. 1.

For example, in FIG. 3B, the virtual 3D model 325 includes objects with attributes to be defined including a tree 302 and the road 306. Attributes for the tree can include a surveyed location of the tree base $T_1$, a tree height $T_h$, a tree type, a trunk diameter, tree health, infestations, damage and the like. Similarly, road 306 attributes include, but are not limited to, locations $R_1$ and $R_2$, a road width $R_w$, surface type, shoulder type and number of lanes.

Figure 3C:
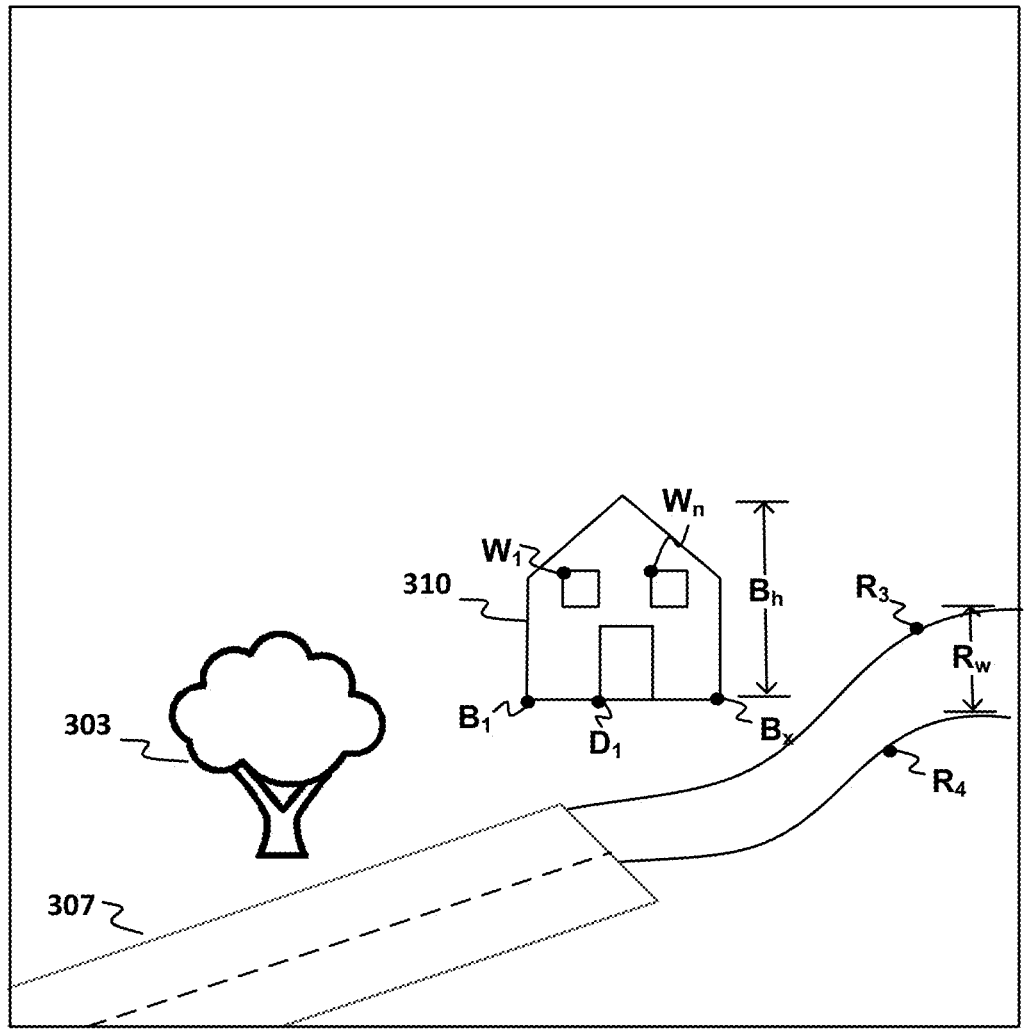
FIG. 3C is a graphical representation of an area to be surveyed having 3D imagery draped over the framework denoting the object, according to one embodiment.
Figure 3D:
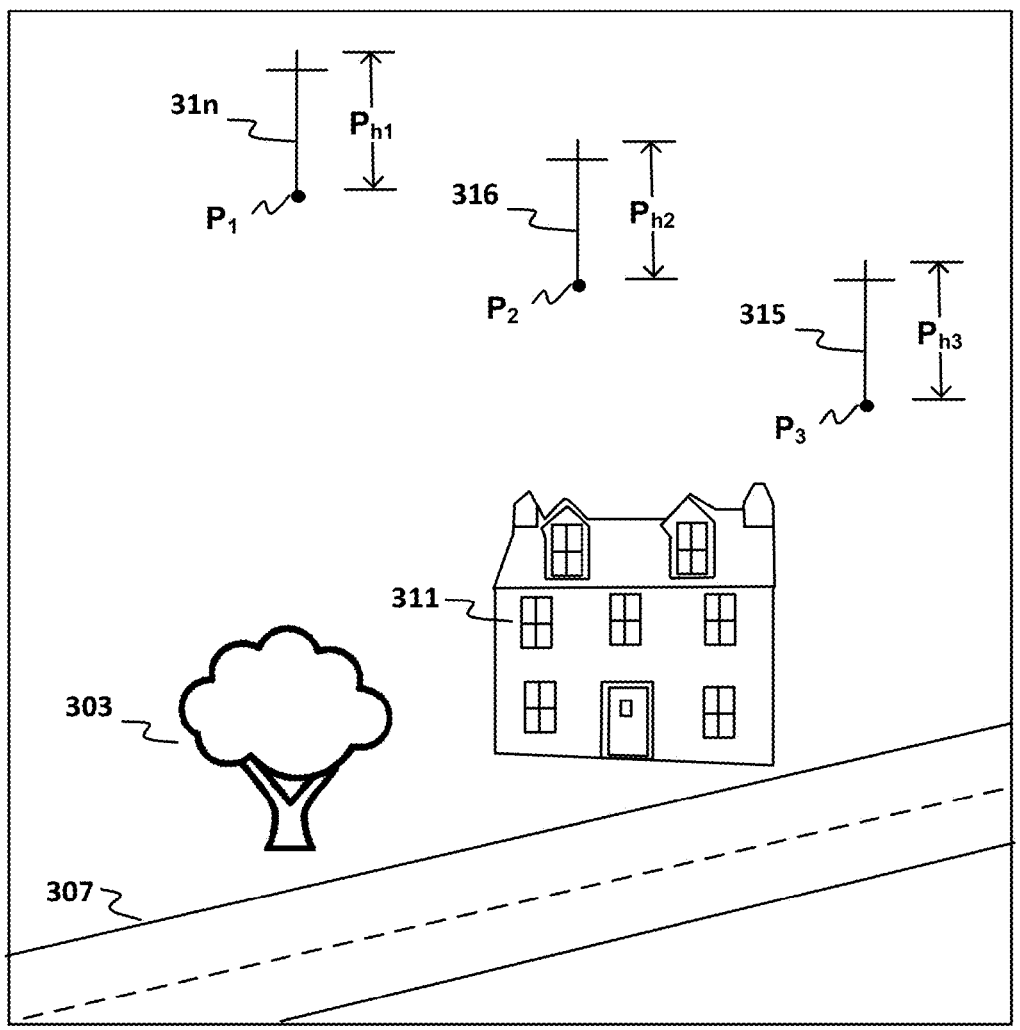
FIG. 3D is a graphical representation of an area to be surveyed having a plurality of framework objects with 3D imagery draped thereover, according to one embodiment.

At FIG. 3C, the virtual model 350 includes the continuation of road 3006 attributes and the addition of building 310 attributes. In one embodiment, building attributes include locations of one or more of the corners $B_1$-$B_x$, building height $B_h$, location of the door $D_1$, width of doorway, height of doorway, location of windows $W_1$-$W_n$, window type, building wall type, roof composition, age, color, etc.

With reference now to 206 of FIG. 2, one embodiment utilizes a wire frame to represent the object in the 3D model. In one embodiment, 3D model creator 110 of FIG. 1 is utilized to populate the virtual 3D model. For example, as shown in FIG. 3B, Tree 302 and road 306 are shown in wire frame. Similarly, in FIG. 3C, the building 310 is shown in wire frame format and in FIG. 3D, telephone poles 315-31n are shown in wire frame format.

Referring now to 208 of FIG. 2, one embodiment links a tag comprising the attributes of the object with the wire frame representation of the object. For example, 3D model creator 110 can provide a tag, link, hyperlink, metadata file, text file, or the like in conjunction with the creation of the wire frame as it is added to the virtual 3D model. For example, in virtual 3D model 325, as the wireframe of tree 302 is added to the virtual 3D model, the attributes such as: a surveyed location of the tree base $T_1$, a tree height $T_h$, a tree type, a trunk diameter, tree health, infestations, damage and the like are linked to the wireframe. In so doing, a selection of tree 303 would provide the underlying surveyed attributes.

With reference now to 210 of FIG. 2, one embodiment drapes imagery of the object over the wire frame of the object. In one embodiment, the imagery of the object is not object specific, but is selected from a 3D object visual database. In FIG. 3C, a 3D model of tree 303 is shown. In one embodiment, the tree is visually selected from a 3D image database 118. For example, database 118 could have been searched for trees, and then further narrowed to the type of tree (e.g., maple). Depending upon the number of results, further defining of the tree may be performed or the tree could be selected from a number of provided visual results. Once the tree was selected, the 3D image of the tree would be scaled and draped over the wireframe.

Smart Design Data

Another example includes surveying As Built structures. That is, surveying what was built and comparing it to determine if it meets the intended design. One embodiment of As Built includes "Smart" design objects that carry some or all of the design object properties. In a smart design, a tap on the design object and a selection of "measure this" can extract the object properties for rendering the "As Built". The properties may include one or more of: the pipe material, size and type. In so doing, the design locations can be retrieved and compared with the actual measured information.

In one embodiment, an additional check can be performed with respect to the design tolerances stored as parameters of the "smart design object". In one embodiment, anything that is out of tolerance or spec., such as: a wrong pipe diameter, material, a pipe in the wrong location, the wrong type of inlet at a location or the like can be flagged. This associative measurement is one embodiment of the 3D virtual survey and it also provides a shortcut to capturing the appropriate data for the rendering of the 3D virtual model.

Smart Existing Data

In one embodiment, when measurements of existing conditions are to be taken, links to the correct geo-location can recall digital imagery from data banks such as topographic maps, satellite imagery, and the like from databases such as: Trimble Outdoors, or aerial photos from aerial surveyor drone type surveys from products such as Trimble Gatewing. In other words, where sufficient resolution exists, and where photos present close to current conditions, a lot of information can be extracted from the images such as materials in areas that can be used to also render the virtual survey either in the field as verification, as a post process or simply as a draping of the image over the surveyed area mapping pixels to the surface model itself as a model rendering.

Parametric Objects

In one embodiment, the objects measured and placed in the virtual model will be connected to the object attributes that created them initially, and will allow real-time changes such as size, orientation, scale, position, and the like. In addition, the objects in the virtual model will move in association with movements of the single or multiple point locations that were used to collect them (e.g. single point tree or fire hydrant, 3 point rectangles to represent a manhole or inlet etc.).

In another embodiment, the imagery of the object may be a photograph or video of the object. In this case, the imagery of the object is object specific. For example, with respect to FIG. 3D, building 311 illustrates an image that has been modified to appear 3D. In one embodiment, the 3D image is created by draped image creator 115. Once the 3D image of the building was created, the 3D image of building 311 would be scaled and draped over the wireframe. In one embodiment, the scaling is taken from the attributes of the object associated with the wireframe.

Referring now to 212 of FIG. 2, one embodiment updates the virtual 3D model of the area. In one embodiment, as shown in the progression from FIGS. 3A-3D, as an object is surveyed it is added to the virtual 3D model. As such, the survey can be viewed, monitored or the like in real-time or near real time. In other words, instead of waiting for a complete record before forming the virtual 3D model, one embodiment updates the virtual 3D model in real time (or near-real time). In general, the updates to the virtual 3D model may occur continuously, may be scheduled to update at a time interval, may be updated as additions, deletions or changes are made, or the like. That is, the frequency of updates can be adjusted based on user needs, number of teams in the field, criticality, personal preference and the like.

Figure 4A:
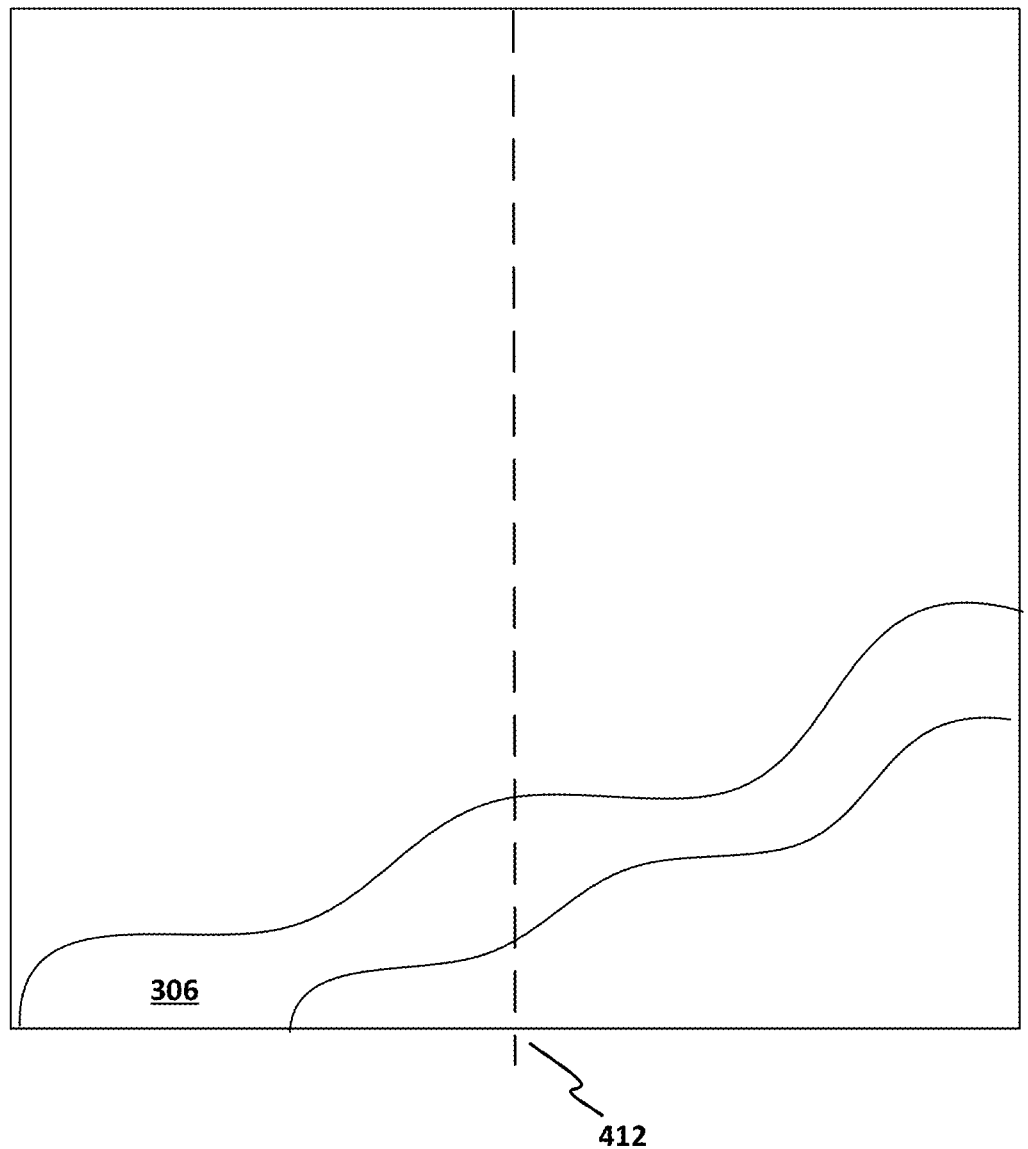
FIG. 4A is a graphical representation of an area to be surveyed in sections according to one embodiment.
Figure 4B:
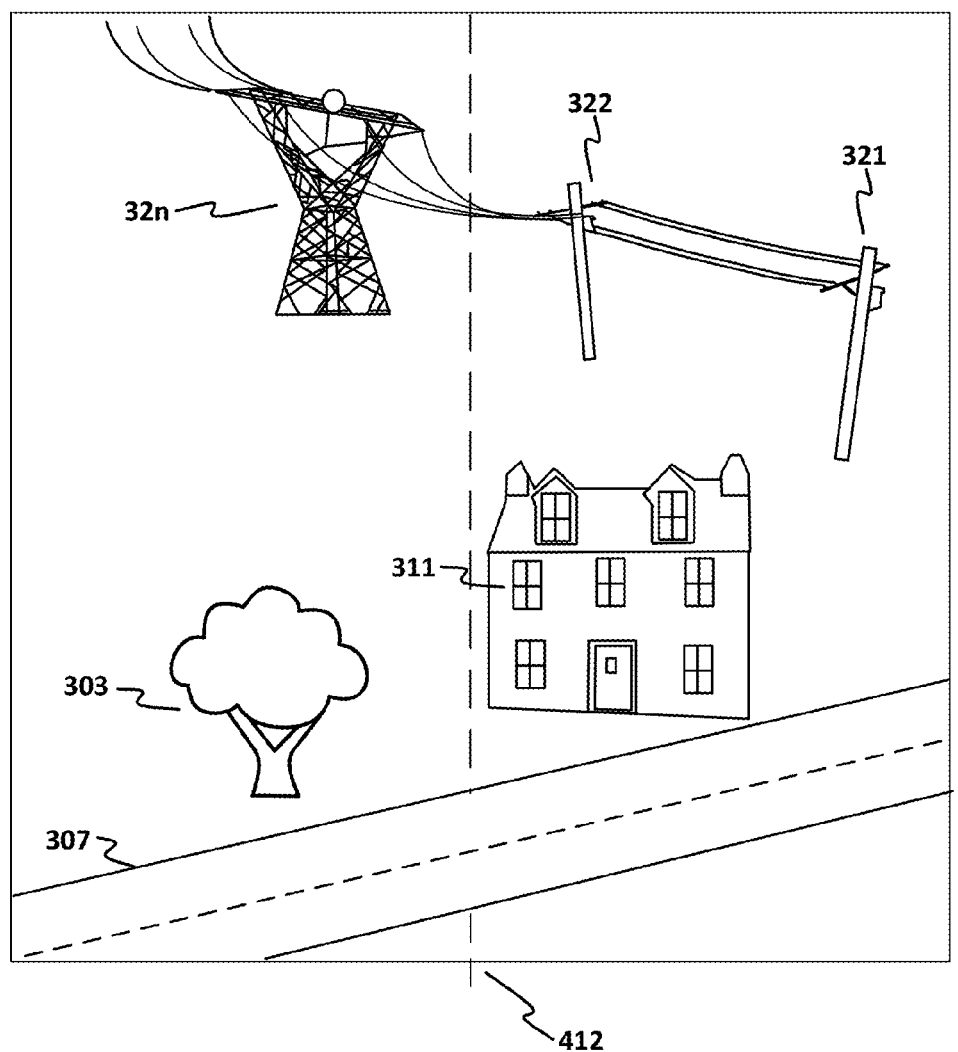
FIG. 4B is a graphical representation of a real-time or near real-time update and comparison to an area being surveyed in sections according to one embodiment.

With reference now to FIG. 4A, a graphical representation of a virtual 3D model 400 area to be surveyed in sections is shown in accordance with one embodiment. In the following discussion, FIGS. 4A-4D utilize a similar example area to be surveyed and generated in the virtual 3D environment. However, in contrast to FIGS. 3A-3D, FIGS. 4A-4D represent the surveyed area being split into sections by divider line 412. Although only a single divider line 412 is shown, it should be appreciated that the real world 101 are to be surveyed may be broken up into any number of sections. Moreover, the surveying of the different sections may be performed by a single entity or a number of different entities.

In a single surveyor embodiment the area to be surveyed may be broken into sections based on the size of the job, the length of time expected to complete the job, areas that need to be surveyed at a scheduled time and the like. For example, if the survey area would take more than one work day to completely survey, the area may be broken into a number of sections and the worker would survey each of the sections at various times or days.

In a multiple surveyor embodiment, the area to be surveyed may be broken into sections and each surveyor would be responsible for a specific section. In so doing, instead of a single worker performing a large job over a couple of days, a plurality of workers could complete the survey in a shorter period of time.

However, by breaking a survey area into a plurality of sections, a number of problems may occur. One problem is shown in virtual 3D model 425 of FIG. 4B. Specifically, virtual 3D model 425 illustrates an error that can occur with respect to the surveying of telephone poles 321-32*n*. In virtual 3D model 425 power poles 321 and 322 have been assigned a similar style 3D image and power pole 32*n* is a completely different style. Because the virtual 3D model 425 is updated in real-time or near real-time, the error can be visually discerned prior to the worker leaving the field. By looking at the virtual 3D model 425, a worker, supervisor, or the like could recognize the inconsistency between the power poles. In addition, since attributes of the poles are linked with each 3D representation, the attributes can also be reviewed in real-time.

Because of the real-time updates to the virtual 3D model 425, a number of different resolutions are possible. In one embodiment, the 3D representation can be reviewed to determine if it is an actual image of the power pole or if it is a 3D representation selected from the 3D image database 118. For example, if power pole 321 and 322 are 3D representations derived from an actual image and power pole 32*n* is a selected 3D image, then a review of the type of power pole 32*n* could be requested.

In another embodiment, if power pole 321 and 322 are 3D representations derived from an actual image and power pole 32*n* is a selected 3D image, then a review of the underlying attributes of the power poles could be performed to ascertain whether or not an error has occurred. For example, if the attributes for each power pole are similar, then a review of the type of power poles 321-32*n* could be requested.

In yet another embodiment, if power pole 32*n* is a 3D representation derived from an actual image and power poles 321 and 322 are selected 3D images, then the underlying attributes could be reviewed and a re-surveying or clarification of the type of power poles 315 and 316 could be requested.

Figure 4C:
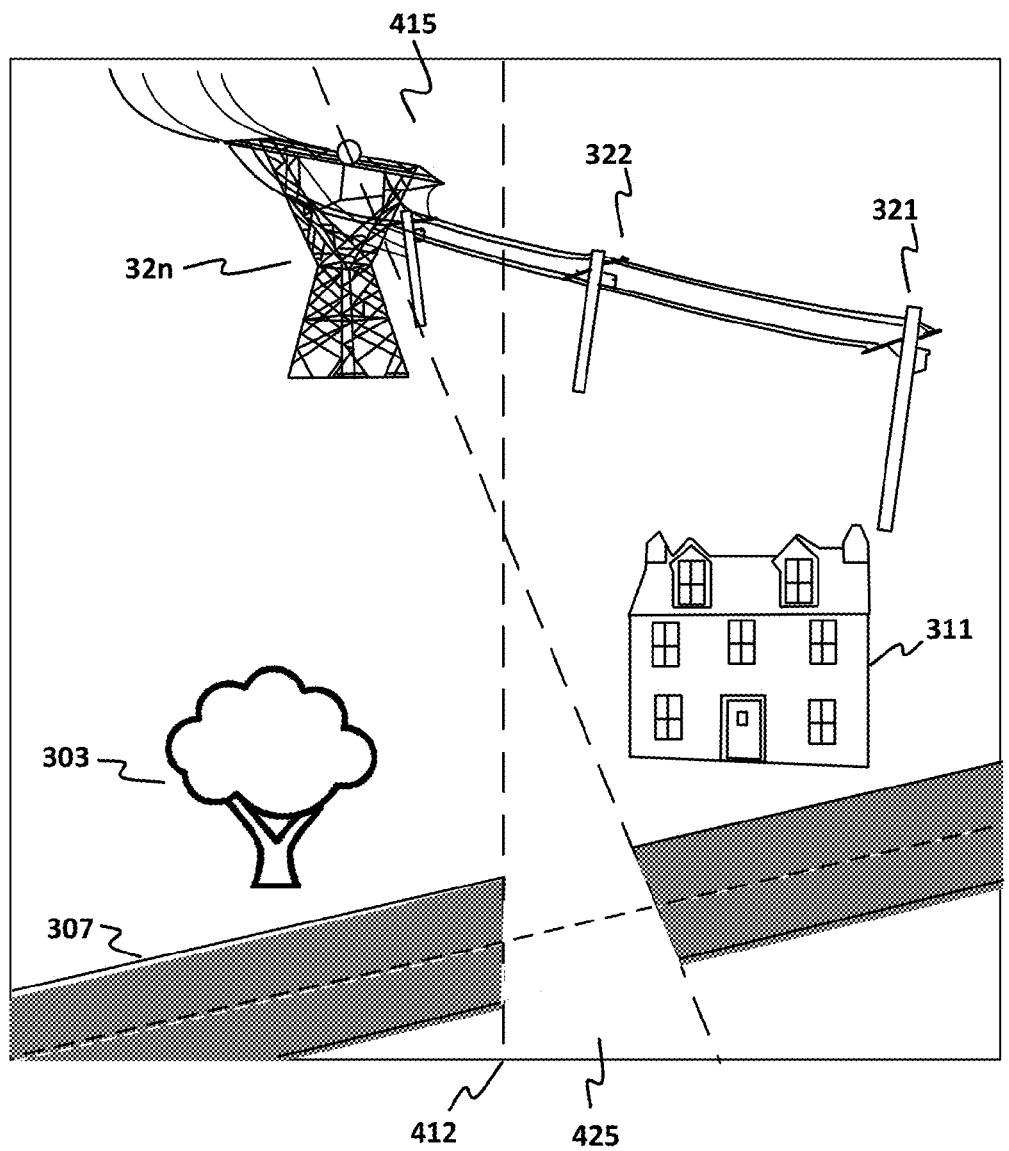
FIG. 4C is a graphical representation of a real-time or near real-time update and comparison to an area being surveyed in sections providing missed or overlapped surveyed areas according to one embodiment.

With reference now to FIG. 4C, a virtual 3D model 450 of a real-time or near real-time update and comparison to an area being surveyed in sections having missed or overlapped surveyed areas is shown in accordance with one embodiment. In virtual 3D model 450, it is apparent that an overlap has occurred at area 415 and a missed portion has occurred in area 425. In area 425, the portion is missing any surveyed data and as such, the virtual 3D model 450 has a blank section that should include road 307. Because the virtual 3D model 450 is frequently updated, a worker, supervisor, or the like could recognize the missing portion of the surveyed virtual 3D model 450 prior to the survey team leaving the field. As such, significant cost and manpower savings can be achieved since an additional trip to the survey site would be negated by the real-time recognition of the missing survey area. Instead, the survey team could be directed to survey the missing area before they ever left the survey area.

Similarly, at overlap area 415, a worker, supervisor, or the like could recognize that an area being surveyed has already been surveyed and incorporated into virtual 3D model 450. By recognizing that an area has already been surveyed, redundancy can be significantly reduced achieving cost and time savings.

Figure 4D:
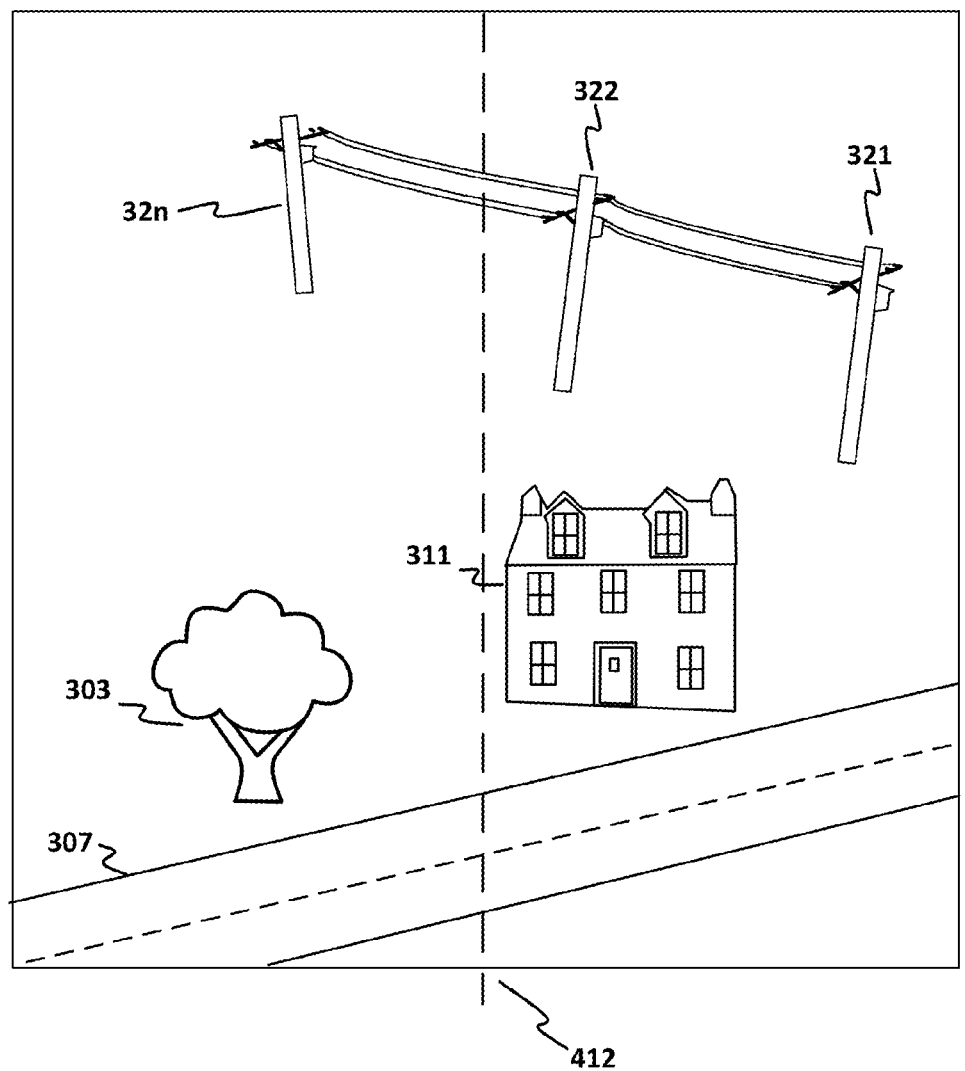
FIG. 4D is a graphical representation of a real-time or near real-time completed virtual 3D model of an area being surveyed in sections in accordance with one embodiment.

Referring now to FIG. 4D, a graphical representation of a real-time or near real-time completed virtual 3D model of an area being surveyed is shown in accordance with one embodiment. In virtual 3D model 475, the missing areas from virtual 3D model 450 have been surveyed; the power pole discrepancy has been fixed resulting in the complete virtual 3D model 475.

In addition, by using a wireframe and then adding 3D imagery to the surveyed area, virtual 3D model 475 realizes significant file size reduction when compared to a 3D virtual model with each pixel in a defined space. For example, instead of having every pixel of the 3D imagery being tied to a specific location, the present virtual 3D model 475 has a 3D virtual representation of the objects and then has a linked data file that contains the location information. Thus, instead of having to provide the location of each pixel used to generate tree 303, the virtual 3D model has an anchor point T1 and then has the associated attributes, such as height, trunk diameter, and the like, linked thereto to provide location information for the entire draped 3D tree imagery 303.

In another embodiment, such as in a 3D building model, a plurality of anchor points, such as building corners $B_1$-$B_x$ are used to anchor the 3D image to the 3D virtual world and attributes are again linked thereby relieving the need to provide each pixel with its own location data. Examples of a few of the different methods for representing the 3D representations are provided herein.

Point Objects

Point objects and associated 2D symbology maybe placed at the correct surveyed elevation that correctly represent the location of the measured data. However in one embodiment, for example a manhole—while manhole type, invert of pipe elevations and material or condition information may be captured along with a photo, video or sketch etc. no attempt is typically made to model that object and represent it as a true 3D object in the database in any form of automated manner. Similarly, a tree can be captured with a 3D location (trunk base) with or without offsets to accurately position the tree center, and attributes that may provide schematic indications of drip line radius, trunk diameter, tree approximate height, condition, infestations and type such as Maple etc.

Linear Objects

With respect to linear objects, one embodiment measures the object, defines where the object is measured e.g. for a pipe in the ground—measured the pipe crown (top of outside of pipe) or the inverts at manhole locations (bottom of inside of pipe etc.) along with attributes such as material, type of material (rigid, flexible, corrugated, perforated etc.) and size (diameter etc.) and use case (storm, sanitary, water, gas etc.). One embodiment automatically draws the real pipes in 3D in the exact location allowing for measured location etc. in the plan drawing or 3D model output.

In one embodiment, a linear object may have multiple linear features associated that are critical for the Modeling process, for example, a curb may have an edge of pavement line, the flow line, the top front face of curb, the back of curb and then maybe invisible lines that represent the bottom front and back of curb and so on. In a typical curb object, the relationship between those lines remains geometrically identical along the length so an infield measurement process can first measure the geometry of the x section of the curb and that then allow the user to measure just one of the lines and auto create all of the lines needed to represent the feature accurately in the 3D model as a curb object. In addition, the geometry of the cross section is stored with the object, e.g. 2 foot spill, 1 foot spill, 2 foot catch, 2 foot spill type curbs, so that as different scenarios are encountered, the speed of collection can be enhanced and still maintain the automation of the feature creation in 3D.

Of course, linear objects may be standard along their entire length, or may have variations that follow known patterns in various places along the length. For example, in the case of a curb: drop curbs exist at driveway entrances or pedestrian crossings etc. These follow a prescribed pattern such as: start of drop, end of drop, lower portion, end of drop, start of drop that have known effects on critical defining lines of the curb cross section. In one embodiment, using automatic field collection of these locations that automates the 3D modeling of these occurrences will increase the content and value of 3D virtual modeling of surveyed information.

Area Based Objects (Hybrid of Line Objects)

Typically in a construction or as built process, there are areas of material that exist and need to be demolished or that did not exist and have been or will be created. The materials with which those objects have been created e.g. Concrete, asphalt, gravel, sand, crushed aggregate, or multiple layers of different materials are important because they will cost money to dispose of, can be reused as construction base material or structural fill, or cost money to acquire and install.

In one embodiment, the costs associated with the materials in place being important because the demolition and removal or purchase and installation directly relates to how much the contractor will be paid. Therefore, accurately mapping those areas and getting the materials right is important for payment and billing purposes. Moreover, the areas may or may not be surrounded by a single line of a single type e.g. a grassed area in a quadrangle may be surrounded by a single line of a certain type. In another embodiment, the bounding edges will be of different types—a building wall, a grass edge, a curb and an asphalt area. Collecting an area attribute point that carries the materials of that area e.g. grass, concrete, asphalt etc., can automate the rendering of the area and surface area of a true 3D surface model.

With respect to curved areas, one embodiment automates the densification or chording effect to represent the linear feature as a component contributor to a surface model. That is, the automated collection of curve and straight sections of lines so that the output drawing created is an accurate 3D model of the site that carries all of the surface and 3D object properties as measured.

Association of Data with Surface Models

On embodiment associates measured points, lines or areas with one or more surface objects and have those precisely modeled and rendered with respect to the surface elements that represent existing or constructed surfaces (concrete, asphalt, landscaped areas etc.) or non-surface objects like pipes, trees, manholes that may sit in part on the surface, but have above or below ground functions that need to be represented in plans, profiles, sections, 3D views etc. The representation of the features automatically in a color or material texture rendering of the correct type and of the correct size and spatial representation. That is, filling the space that they truly occupy, and also displaying them not as simple points or 2D symbology but as truly 3D objects (where applicable) extracted from a virtual 3D warehouse and connected to the measured data for position, orientation and scale etc. In one embodiment, the information is provided directly on measurement in the field, on import and processing of the data from the field devices or on submission either in real time or as a post process batch operation from one or more devices via a web service that can display back the 3D model for checking, validation purposes in the office or on site prior to leaving the job.

Fitting in with the Current Surveying Services Market Place

To meet current deliverable expectations, it is expected that the user would need to be able to represent the measured objects as true 3D objects and using the conventional 2D plans, profiles and cross sections. However even the traditional 2D deliverables can be enhanced through displaying the true objects as either sliced renderings in sectional views (for pipes etc.) or as 3D objects that sit on a surface cross section behind the cutting plane of the cross section etc.

Dating and Timing the Object Measurements

In one embodiment, objects measured are dated and timed. For example, in a construction project measured objects may be here today and gone tomorrow because they were demolished or not here today and arrive tomorrow as they are constructed and measured for As Builts. The time element of when an object appeared, or when a surface reached a certain state is important for construction playback sequencing observation. That is, allowing for validation of construction schedules and timelines and to be able to track and monitor projects over time. In other words, in one embodiment, the data representing the 3D model may be aggregated over many months of a project, making many measurements over time, often in the same area, and from that data be able to rapidly establish a status of the construction 3D model at any Date and Time selected.

Measurement Methodology Considerations

In general, surveyors know that the more data collected the more accurately the surfaces and objects are represented. However the art of detail survey is the provision of automated scripts and switches that allow typical conditions to be collected with minimal data and yet still represent the objects and surfaces faithfully in the computer models. For example collecting point objects with offsets that allow for the fact that the physical object location cannot be occupied (building corners, telegraph poles, light poles etc.), measuring one or more parallel lines at the same time that are offset geometrically from each other, measuring rectangles with 3 points rather than 4, allowing lines to be open or closed, allowing a line to start at the termination of another, allowing multiple objects to be measured and recorded at the same location e.g. a gate and a gate post and the end of a fence line etc. and decoding those tricks using algorithmic processes that decode them as lines and then replace the lines with real world object renderings extracted from a 3D warehouse. Automated collection of drop curb instances along a curb line is one example to create accurate models of driveway entrances etc.

Photo Verification of Objects

As described herein, in one embodiment, by using photos taken in the field to match up with the assigned object renderings, and allowing mass substitution on post process analysis can be used to identify the mistake, select the alternative and correct object and have it mass substitute e.g. grass could be substituted for seeding, a tree type could be substituted for another or a pipe material changed from steel to plastic or rigid to corrugated etc., and the renderings auto reflect the changes.

Computing Power Considerations

In one embodiment, based on different processing power, connectivity, computer capabilities and the like, there may be a need to represent things in the field in a lighter form than in the office. For example, grass could be a green shading in the field or a textured shading in the office solution. Similarly, a pipe may be a simple line in the field, but a fully automated 3D pipe in the office and so on. Thus, in one embodiment, intelligent substitution of objects and representations will be used to provide operation and utilization based on different operating systems such as: smart phone, handheld computing devices, laptops, notebooks, tablets, automobile GUIs, Desktop computers, Internet based systems, Cloud based systems, etc.

Computer System

Figure 5:
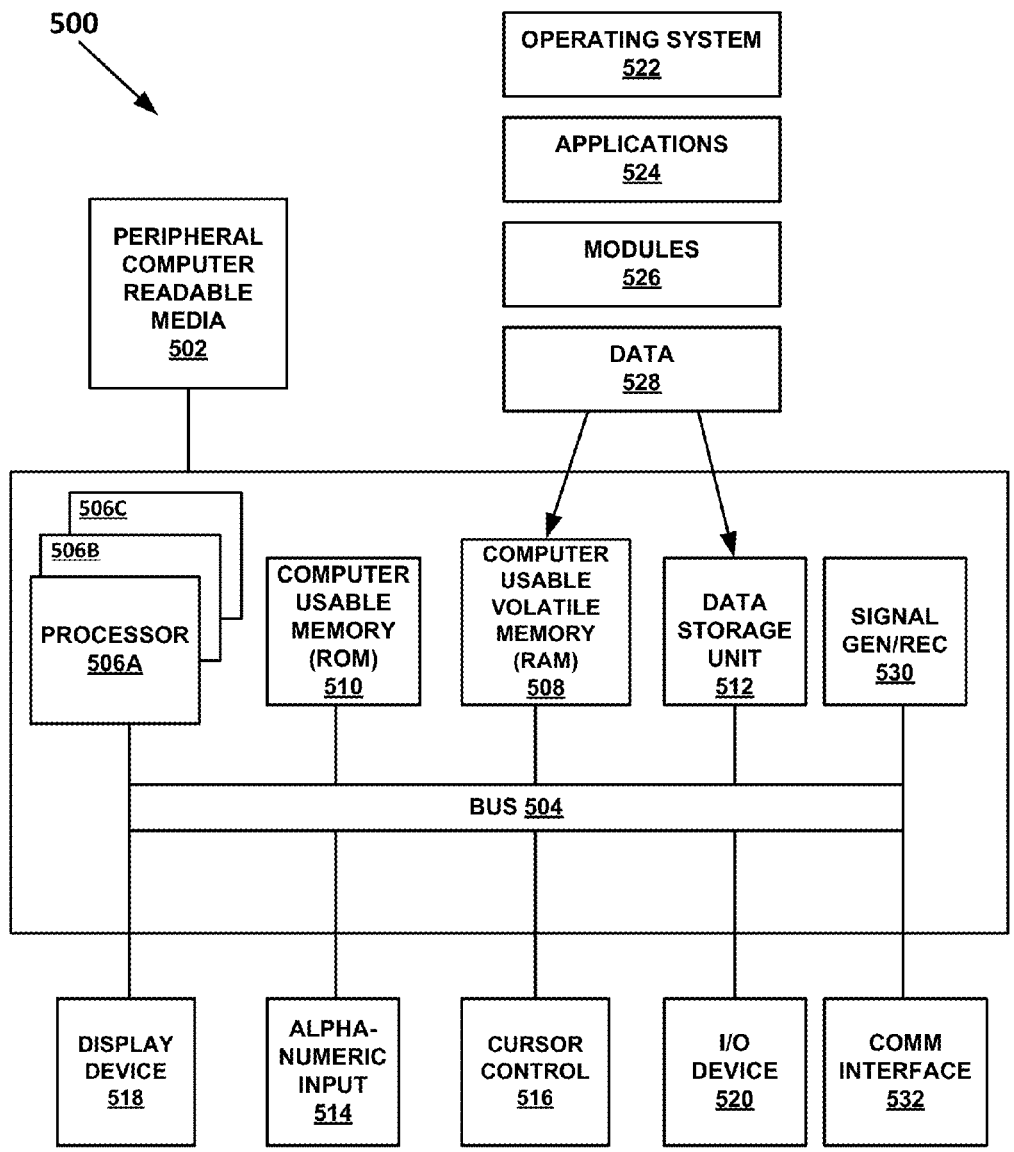
FIG. 5 is a block diagram of an example computer system upon which embodiments may be implemented.

With reference now to FIG. 5, portions of the technology for providing a communication composed of computer-readable and computer-executable instructions that reside, for example, in non-transitory computer-usable storage media of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components of FIG. 1 or FIG. 3 may be combined with some or all of the components of FIG. 5 to practice the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a floppy disk, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 of the present embodiment also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described system 500.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, antenna, or other input/output interface. Communication interface 532 may physically, electrically, optically, or wirelessly (e.g. via radio frequency) couple system 500 with another device, such as a cellular telephone, radio, or computer system.

The computing system 500 is only one example of a suitable computing environment and is not intended to suggest any limitation as to the scope of use or functionality of the present technology. Neither should the computing environment 500 be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

GNSS Receiver

Figure 6:
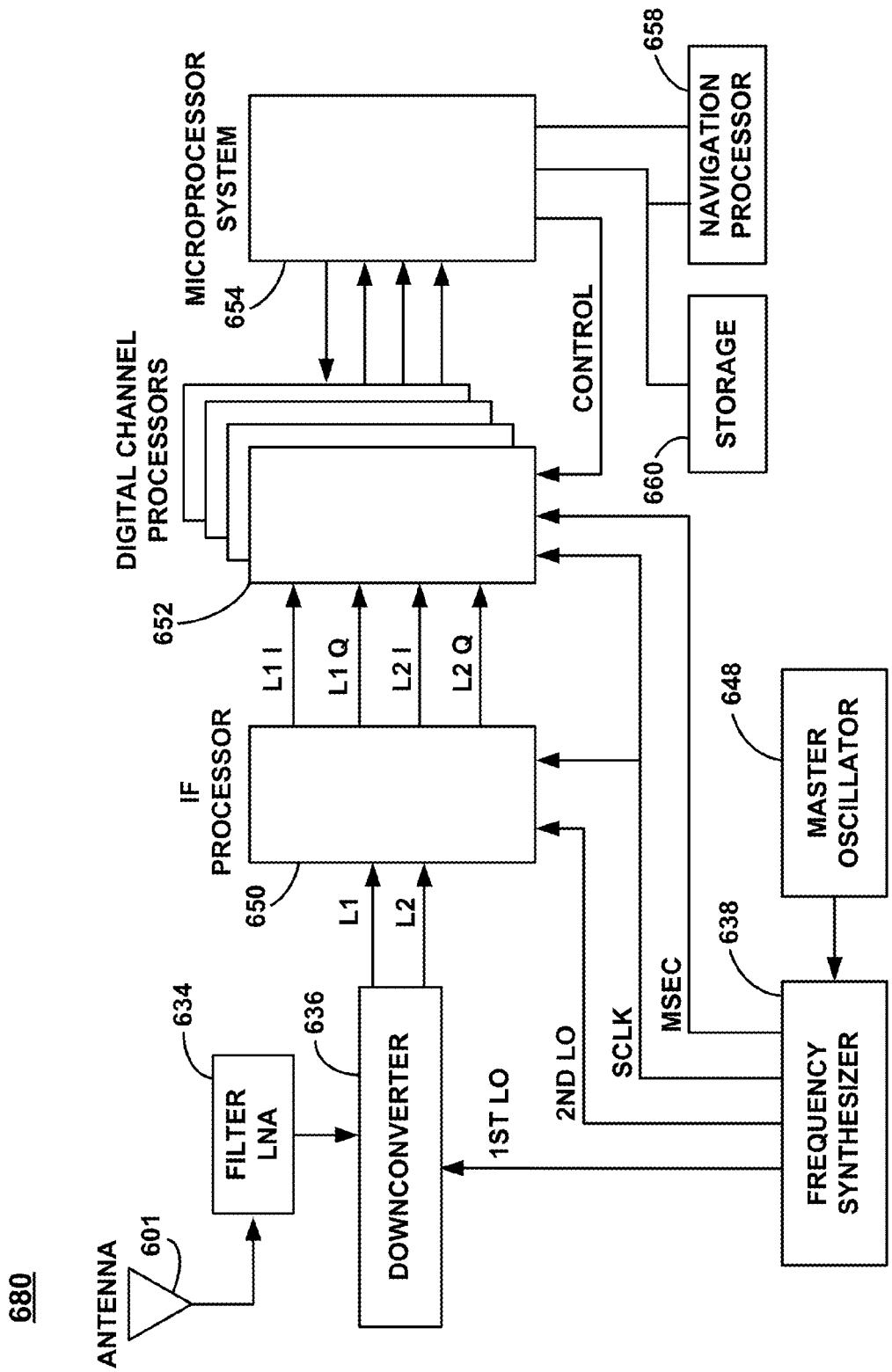
FIG. 6 is a block diagram of an example global navigation satellite system (GNSS) receiver which may be used in accordance with one embodiment.

With reference now to FIG. 6, a block diagram is shown of an embodiment of an example GNSS receiver which may be used in accordance with various embodiments described herein. In particular, FIG. 6 illustrates a block diagram of a GNSS receiver in the form of a general purpose Global Positioning System (GPS) receiver 680 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Further, although L1 and L2 signals are described, they should not be construed as a limitation to the signal type; instead, the use of the L1 and L2 signal(s) is provided merely for clarity in the present discussion.

Although an embodiment of a GNSS receiver and operation with respect to GPS is described herein, the technology is well suited for use with numerous other GNSS signal(s) including, but not limited to, GPS signal(s), Glonass signal(s), Galileo signal(s), and Compass signal(s).

The technology is also well suited for use with regional navigation satellite system signal(s) including, but not limited to, Omnistar signal(s), StarFire signal(s), Centerpoint signal(s), Beidou signal(s), Doppler orbitography and radio-positioning integrated by satellite (DORIS) signal(s), Indian regional navigational satellite system (IRNSS) signal(s), quasi-zenith satellite system (QZSS) signal(s), and the like.

Moreover, the technology may utilize various satellite based augmentation system (SBAS) signal(s) such as, but not limited to, wide area augmentation system (WAAS) signal(s), European geostationary navigation overlay service (EGNOS) signal(s), multi-functional satellite augmentation system (MSAS) signal(s), GPS aided geo augmented navigation (GAGAN) signal(s), and the like.

In addition, the technology may further utilize ground based augmentation systems (GBAS) signal(s) such as, but not limited to, local area augmentation system (LAAS) signal(s), ground-based regional augmentation system (GRAS) signals, Differential GPS (DGPS) signal(s), continuously operating reference stations (CORS) signal(s), and the like.

Although the example herein utilizes GPS, the present technology may utilize any of the plurality of different navigation system signal(s). Moreover, the present technology may utilize two or more different types of navigation system signal(s) to generate location information. Thus, although a GPS operational example is provided herein it is merely for purposes of clarity.

In one embodiment, the present technology may be utilized by GNSS receivers which access the L1 signals alone, or in combination with the L2 signal(s). A more detailed discussion of the function of a receiver such as GPS receiver 680 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 680 of FIG. 6.

In FIG. 6, received L1 and L2 signal is generated by at least one GPS satellite. Each GPS satellite generates different signal L1 and L2 signals and they are processed by different digital channel processors 652 which operate in the same way as one another. FIG. 6 shows GPS signals (L1=1575.42 MHz, L2=1227.60 MHz) entering GPS receiver 680 through a dual frequency antenna 601. Antenna 601 may be a magnetically mountable model commercially available from Trimble® Navigation of Sunnyvale, Calif., 94085. Master oscillator 648 provides the reference oscillator which drives all other clocks in the system. Frequency synthesizer 638 takes the output of master oscillator 648 and generates important clock and local oscillator frequencies used throughout the system. For example, in one embodiment frequency synthesizer 638 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 634 performs filtering and low noise amplification of both L1 and L2 signals. The noise figure of GPS receiver 680 is dictated by the performance of the filter/LNA combination. The downconverter 636 mixes both L1 and L2 signals in frequency down to approximately 175 MHz and outputs the analogue L1 and L2 signals into an IF (intermediate frequency) processor 30. IF processor 650 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 652 inputs the digitally sampled L1 and L2 inphase and quadrature signals. All digital channel processors 652 are typically identical by design and typically operate on identical input samples. Each digital channel processor 652 is designed to digitally track the L1 and L2 signals produced by one satellite by tracking code and carrier signals and to form code and carrier phase measurements in conjunction with the microprocessor system 654. One digital channel processor 652 is capable of tracking one satellite in both L1 and L2 channels.

Microprocessor system 654 is a general purpose computing device which facilitates tracking and measurements processes, providing pseudorange and carrier phase measurements for a navigation processor 658. In one embodiment, microprocessor system 654 provides signals to control the operation of one or more digital channel processors 652. Navigation processor 658 performs the higher level function of combining measurements in such a way as to produce position, velocity and time information for the differential and surveying functions. Storage 660 is coupled with navigation processor 658 and microprocessor system 654. It is appreciated that storage 660 may comprise a volatile or non-volatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Differential GPS

Embodiments of the present invention can use Differential GPS to determine position information with respect to a jib of the tower crane. Differential GPS (DGPS) utilizes a reference station which is located at a surveyed position to gather data and deduce corrections for the various error contributions which reduce the precision of determining a position fix. For example, as the GNSS signals pass through the ionosphere and troposphere, propagation delays may occur. Other factors which may reduce the precision of determining a position fix may include satellite clock errors, GNSS receiver clock errors, and satellite position errors (ephemeredes).

The reference station receives essentially the same GNSS signals as rovers which may also be operating in the area. However, instead of using the timing signals from the GNSS satellites to calculate its position, it uses its known position to calculate timing. In other words, the reference station determines what the timing signals from the GNSS satellites should be in order to calculate the position at which the reference station is known to be. The difference between the received GNSS signals and what they optimally should be is used as an error correction factor for other GNSS receivers in the area. Typically, the reference station broadcasts the error correction to, for example, a rover which uses this data to determine its position more precisely. Alternatively, the error corrections may be stored for later retrieval and correction via post-processing techniques.

Real-Time Kinematic System

An improvement to DGPS methods is referred to as Real-time Kinematic (RTK). As in the DGPS method, the RTK method, utilizes a reference station located at determined or surveyed point. The reference station collects data from the same set of satellites in view by the rovers in the area. Measurements of GNSS signal errors taken at the reference station (e.g., dual-frequency code and carrier phase signal errors) and broadcast to one or more rovers working in the area. The rover(s) combine the reference station data with locally collected position measurements to estimate local carrier-phase ambiguities, thus allowing a more precise determination of the rover's position. The RTK method is different from DGPS methods in that the vector from a reference station to a rover is determined (e.g., using the double differences method). In DGPS methods, reference stations are used to calculate the changes needed in each pseudorange for a given satellite in view of the reference station, and the rover, to correct for the various error contributions. Thus, DGPS systems broadcast pseudorange correction numbers second-by-second for each satellite in view, or store the data for later retrieval as described above.

RTK allows surveyors to determine a true surveyed data point in real time, while taking the data. However, the range of useful corrections with a single reference station is typically limited to about 70 km because the variable in propagation delay (increase in apparent path length from satellite to rover receiver, or pseudo range) changes significantly for separation distances beyond 70 km. This is because the ionosphere is typically not homogeneous in its density of electrons, and because the electron density may change based on, for example, the sun's position and therefore time of day. Thus for surveying or other positioning systems which must work over larger regions, the surveyor must either place additional base stations in the regions of interest, or move his base stations from place to place. This range limitation has led to the development of more complex enhancements that have superseded the normal RTK operations described above, and in some cases eliminated the need for a base station GNSS receiver altogether. This enhancement is referred to as the "Network RTK" or "Virtual Reference Station" (VRS) system and method.

Network RTK

Network RTK typically uses three or more GNSS reference stations to collect GNSS data and extract information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network. The control center computer processor then applies a process which interpolates the atmospheric and/or satellite ephemeris errors at any given point within the network coverage area and generates a pseudo range correction comprising the actual pseudo ranges that can be used to create a virtual reference station. The control center then performs a series of calculations and creates a set of correction models that provide the rover with the means to estimate the ionospheric path delay from each satellite in view from the rover, and to take account other error contributions for those same satellites at the current instant in time for the rover's location.

The rover is configured to couple a data-capable cellular telephone to its internal signal processing system. The surveyor operating the rover determines that he needs to activate the VRS process and initiates a call to the control center to make a connection with the processing computer. The rover sends its approximate position, based on raw GNSS data from the satellites in view without any corrections, to the control center. Typically, this approximate position is accurate to approximately 4-7 meters. The surveyor then requests a set of "modeled observables" for the specific location of the rover. The control center performs a series of calculations and creates a set of correction models that provide the rover with the means to estimate the ionospheric path delay from each satellite in view from the rover, and to take into account other error contributions for those same satellites at the current instant in time for the rover's location. In other words, the corrections for a specific rover at a specific location are determined on command by the central processor at the control center and a corrected data stream is sent from the control center to the rover. Alternatively, the control center may instead send atmospheric and ephemeris corrections to the rover which then uses that information to determine its position more precisely.

These corrections are now sufficiently precise that the high performance position accuracy standard of 2-3 cm may be determined, in real time, for any arbitrary rover position. Thus the GNSS rover's raw GNSS data fix can be corrected to a degree that makes it behave as if it were a surveyed reference location; hence the terminology "virtual reference station." An example of a network RTK system in accordance with embodiments of the present invention is described in U.S. Pat. No. 5,899,957, entitled "Carrier Phase Differential GPS Corrections Network," by Peter Loomis, assigned to the assignee of the present patent application and incorporated as reference herein in its entirety.

The Virtual Reference Station method extends the allowable distance from any reference station to the rovers. Reference stations may now be located hundreds of miles apart, and corrections can be generated for any point within an area surrounded by reference stations.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for real-time 3D map generation during a survey, the method comprising:
   accessing a 3D model of an area to be surveyed by a plurality of different survey devices operating within the area to be surveyed, wherein the 3D model of the area is generated from at least one of an aerial map, a topographical map, a terrain map, a physical map, a road map, or as satellite map;
   selecting, by one of the plurality of different survey devices, an object located within the area to be surveyed;
   determining, by the one of the plurality of different survey devices, a location of the object;
   defining, by the one of the plurality of different survey devices, attributes of the object, the attributes including a size of the object and the location of the object;
   utilizing, by the one of the plurality of different survey devices, a wire frame to represent the object in the 3D model; thereafter
   associating, by the one of the one plurality of different survey devices, the attributes of the object with the wire frame representation of the object in the 3D model;
   draping, by the one of the plurality of different survey devices, imagery of the object over the wire frame of the object to form a 3D image of the object within the 3D model, the imagery generated from one or more images of the object by scaling the one or more images based on the attributes of the object;
   updating the 3D model on each of the plurality of different survey devices operating within the area to include the 3D image of the object;
   comparing, by the one of the plurality of different survey devices, attributes of the object with intended design information to determine whether differences are within predetermined design tolerances; and
   providing an output if the differences are not within the predetermined design tolerances.

2. The method of claim 1 wherein the attributes of the object are selected from the group consisting of: location, height, width, depth, material type(s), physical description, and scientific name.

3. A 3D survey site modeling system stored on a non-transitory computer-readable storage medium, the system comprising:
   a survey data collector to collect survey data for each object that is surveyed, the survey data including a size of each object and a location of each object; and
   a 3D model creator to receive the collected survey data and create a 3D model of the location being surveyed in real time, where a creation of the 3D model is done in a cloud allowing visualization of the model both in a field environment and in an office setting during a survey process, wherein for each object the creation comprises:
      utilizing a wire frame to represent the object in the 3D model; and
      draping imagery of the object over the wireframe of the object to form a 3D image of the object, the imagery generated from one or more images of the object by scaling the one or more images based on the attributes of the object;
   a real-time comparator to compare the 3D model of the location being surveyed with intended design information for the location to determine whether differences are within predetermined design tolerances and provide an output if the differences are not within the predetermined design tolerances.

4. The 3D survey site modeling system of claim 3 further comprising:
   a draped image creator to use the information for each object to select a 3D representation of the object from a 3D model database.

5. The 3D survey site modeling system of claim 3 further comprising:
   a photogramatic processing module to incorporate an image of the object with a 3D representation of the object selected from a 3D imagery database and to incorporate the 3D representation of the object into the 3D model of the location being surveyed.

6. The 3D survey site modeling system of claim 3 where the objects are sized and dimensioned based on one or more measurement taken to the object in the field.

7. The 3D survey site modeling system of claim 3 where imagery collected in the survey process is draped onto the model.

8. A non-transitory computer-readable storage medium comprising computer executable code for directing a processor to execute a method for real-time 3D map generation during a survey, the method comprising:
   accessing a 3D model of an area to be surveyed by a plurality of different survey devices operating within the area to be surveyed, wherein the 3D model of the area is generated from at least one of an aerial map, a topographical map, a terrain map, a physical map, a road map, or a satellite map;
   selecting, by one of the plurality of different survey devices, an object located within the area to be surveyed;
   determining, by the one of the plurality of different survey devices, a location of the object;
   determining, by the one of the plurality of different survey devices, attributes of the, the attributes including a size of the object and the location of the object;
   utilizing, by the one of the plurality of different survey devices, a wire frame representation of the object to the 3D model; thereafter
   associating, by the one of the plurality of different survey devices, the attributes of the object with the wire frame representation of the object in the 3D model;
   draping, by the one of the plurality of different survey devices, imagery of the object over the wire frame of the object to form a 3D image of the object within the 3D model, the imagery generated from one or more images of the object by scaling the one or more images based on the attributes of the object;
   updating the 3D model on each of the plurality of different survey devices operating within the area to include the 3D image of the object;
   comparing, by the one of the plurality of different survey devices, attributes of the object with intended design information to determine whether differences are within predetermined design tolerances; and
   providing an output if the differences are not within the predetermined design tolerances.

9. The non-transitory computer-readable storage medium recited of claim 8 wherein the attributes of the object are selected from the group consisting of: location, height, width, depth, material type(s), physical description, and scientific name.

* * * * *